Oct. 17, 1939.  J. L. CREVELING  2,176,296

METHOD OF MAKING LUBRICATING DEVICES

Original Filed Sept. 17, 1931

INVENTOR
JOHN L. CREVELING.
BY
ATTORNEY

Patented Oct. 17, 1939

2,176,296

UNITED STATES PATENT OFFICE 2,176,296

METHOD OF MAKING LUBRICATING DEVICES

John L. Creveling, near Tucson, Ariz., assignor to The Lubrication Corporation, Chicago, Ill., a corporation of Delaware Original application September 17, 1931, Serial No. 563,409. Divided and this application January 8, 1936, Serial No. 58,103

2 Claims. (Cl. 29—157)

This invention relates to lubricating devices and a method of making the same and more particularly to lubricant receiving fittings adapted to be more or less permanently secured to a bearing or other part of a machine to be lubricated.

According to one system of lubrication widely practiced at the present time, a lubricant receiving fitting is secured to each bearing or other part of a machine to be lubricated and a nozzle, connected to a grease gun or other source of lubricant under pressure, is successively engaged with each fitting to force lubricant therethrough to the parts to be lubricated. The fittings are preferably constructed with valves to prevent egress of lubricant, with heads to be engaged by the nozzle, and with shanks formed with threads or other fastening means by which they are secured to the machine. It is essential that the fitting heads be formed accurately in order to provide a surface against which the nozzle can seal and that the valves be assembled properly within the fittings in order to prevent leakage of lubricant. Also, since a large number of fittings may be used on a single machine, it is important that the cost of forming the fittings and assembling the valves therein be maintained as low as possible.

Accordingly, it is one of the objects of the invention to provide a method of forming lubricant fittings by which the size and configuration of the fittings is accurately controlled and which is simple and inexpensive to carry out.

Another object is to provide a method of forming a valved lubricant fitting by which the fitting and valve may be readily and properly assembled.

Another object is to provide a lubricant fitting which is simple in construction and which presents an accurately formed surface for engagement by a nozzle.

Other objects and advantages of the invention will be apparent from the following detail description when taken in connection with the accompanying drawing, in which.

Figure 1:
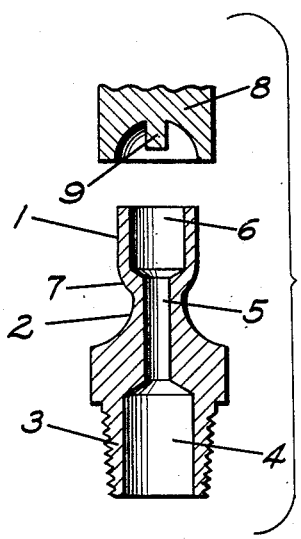
Fig. 1 is an axial section illustrating a blank employed in one method of forming a fitting according to the invention and a die for use in forming the blank.

The fitting illustrated in the drawing is of the ball head type more particularly described in the patent to Morris No. 1,962,254 and in my copending application Serial No. 563,409 of which this application is a division. The fitting in general comprises a head portion of spherical form, a reduced neck and a shank formed with screw threads or other fastening means for securing it to part of a machine to be lubricated. A valve is preferably provided in the fitting to prevent leakage of lubricant therefrom and may be urged upon its seat by a suitable spring.

The blank illustrated in Fig. 1 is formed by any suitable method to include a head portion 1, a neck portion 2, and a shank portion 3 which is shown as provided with a screw thread. The blank is provided with an enlarged bore 4 through the shank, a bore of reduced diameter 5 through the neck portion, and an enlarged bore 6 through the head. The exterior of the head is formed adjacent the outer end as a cylinder to provide a relatively thin walled tubular end portion which is connected to the neck by a substantially spherical portion 7.

To complete the head of the blank of Fig. 1 a suitable die indicated at 8 is pressed against the outer end thereof to turn in the tubular portion to form a part of a sphere merging into and concentric with the spherical portion 7. The die 8 preferably includes a projecting pin or the like 9 which forms a reduced inlet opening in the completed head portion and which will be engaged by the edges of the tubular portion of the head to form a cylindrical opening. If desired, an excess of metal may be provided in the tubular head portion so that when it is engaged by the die, metal will be caused to flow around the pin 9 to form an annular shoulder 11 constituting a valve seat. If desired, the inlet opening into the head may be drilled or reamed out subsequent to the pressing operation and the valve seat 11 may be faced by a suitable tool inserted through the bore 5.

Figure 2:
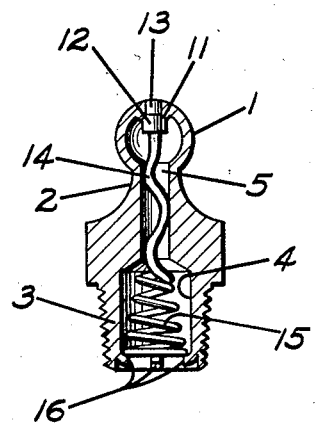
Fig. 2 is an axial section through a completed fitting of a type which may be formed from the blank of Fig. 1.

After the fitting head has been formed by the die 8, a valve is inserted into the fitting through the shank 3 and as shown in Fig. 2 the valve may be formed of a continuous length of wire upset adjacent one end to form a valve member 12 which is adapted to seat on the annular shoulder 11. A short length of wire 13 projects from one side of the valve member 12 and is of substantially the same length as the thickness of the shoulder 11 so that when the valve 12 is seated on the shoulder 11 the outer end of the wire 13 will lie substantially flush with the outer surface of the fitting.

At the other side of the valve member 12, the wire is formed into a long helix 14 extending through the bore 5 and preferably engaging the sides thereof to guide the valve member 12 accurately to its seat. The portion of the wire adjacent the helix 14 is coiled to form a spring 15 lying in the bore 4 and urging the valve member upon its seat. The valve may be retained in the fitting as shown by upsetting a plurality of lugs 16 at the outer end of the shank portion upon which lugs the spring 15 rests. It will be noted that when the valve is in closed position, the outer end of wire 13 will substantially close the inlet opening into the fitting head and will prevent ingress of any dirt or other foreign matter into the fitting or to the bearing to which it is connected. When a nozzle is applied to the fitting, it forms a seal with the spherical fitting head and lubricant pressure acting on the valve opens it against the compression of the spring 15 to permit flow of lubricant into the machine part.

Figure 3:
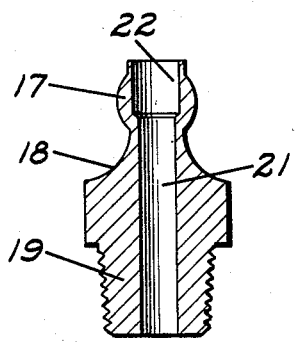
Fig. 3 is an axial section through another form of blank illustrating a modified method.
Figure 4:
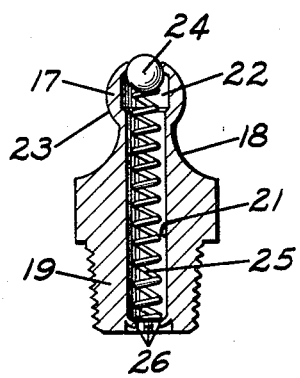
Fig. 4 is an axial section through a completed fitting of a type which may be formed from the blank of Fig. 3.

Fig. 3 illustrates a blank employed in a modified method which is formed in any suitable manner and which includes a head portion 17, a neck portion 18 and a shank 19. The blank of Fig. 3 is provided with a bore 21 of substantially uniform diameter extending through the shank and the neck and a slightly enlarged bore 22 in the head portion. The head 17 is formed with an external spherical contour throughout the major part of its surface and a relatively narrow annular projection or lip 23 adjacent the outer end of the bore 22.

To complete the blank of Fig. 3, the annular lip 23 is turned in by a die such as the die 8 of Fig. 1, leaving the head 17 with a smooth spherical outer surface and providing a valve seat at the outer end of the bore 22. A ball valve 24 may be inserted from the outer end of the bore 22 prior to turning in the lip 23 or may be inserted through the bore 21 subsequent to turning in of the lip 23 and is adapted to seat on the valve seat formed by the inturned lip 23 and is urged against its seat by a coil spring 25 in the bore 21. If desired, the ball 24 might be inserted in the bore 22 and held in place by a tool passing through the bore 21, the lip 23 being forced against the ball to provide a smooth, tight valve seat. The coil spring may be held in place by inwardly swaged lugs 26 at the outer end of the shank 19.

Thus the present invention provides an extremely simple and inexpensive method of forming lubricant fittings by which valved fittings which are rugged in construction and positive in use may be formed. The fittings could, if desired, be formed even more accurately following formation thereof as described above by a slight turning or scrapping operation or by mere burnishing.

While two embodiments of the invention have been illustrated and described, it will be apparent that many changes might be made therein and it is not intended to be limited to the embodiments shown or otherwise than by the terms of the appended claims.

I claim:

1. The method of forming a lubricant receiving fitting which comprises forming a blank having a shank portion and a body portion of relatively heavy cross section and a head portion including a relatively thin cylindrical end, and swaging over said end to form a substantially spherical head having a relatively small grease passage therethrough.

2. The method of forming a lubricant receiving fitting which comprises forming a blank having a shank portion and a body portion of relatively heavy cross section and a head portion of partispherical contour with a relatively thin cylindrical flange at one end, and swaging over said flange to form a continuation of the spherical contour and to leave a relatively small passage for grease into the head.

JOHN L. CREVELING.